United States Patent [19]

Hammer et al.

[11] Patent Number: 4,563,376

[45] Date of Patent: Jan. 7, 1986

[54] TUBULAR FOOD CASING HAVING A COATING ON ITS INSIDE SURFACE, A PROCESS FOR ITS MANUFACTURE AND USE AS A SAUSAGE SKIN

[75] Inventors: Klaus-Dieter Hammer, Mainz; Erwin Kindl, Wiesbaden; Heinz Luchterhand, Wiesbaden; Hermann Winter, Wiesbaden, all of Fed. Rep. of Germany

[73] Assignee: Hoechst Aktiengesellschaft, Frankfurt am Main, Fed. Rep. of Germany

[21] Appl. No.: 471,208

[22] Filed: Mar. 1, 1983

[30] Foreign Application Priority Data

Mar. 8, 1982 [DE] Fed. Rep. of Germany ....... 3208283

[51] Int. Cl.$^4$ .................... F16L 11/00; A22C 13/00
[52] U.S. Cl. ................... 428/36; 428/510; 138/118.1; 426/105; 426/135
[58] Field of Search ............ 138/118.1; 428/36, 510, 428/478.4, 479.3; 426/105, 135

[56] References Cited

U.S. PATENT DOCUMENTS

| | | |
|---|---|---|
| 2,345,543 | 3/1944 | Wohnsiedler et al. ............... 260/72 |
| 2,573,956 | 10/1951 | Daniel et al. ......................... 117/76 |
| 2,616,874 | 10/1952 | Yost et al. ............................ 260/70 |
| 2,796,362 | 6/1957 | Wooding et al. ..................... 117/71 |
| 2,901,358 | 8/1959 | Underwood et al. ................. 99/176 |
| 2,926,154 | 2/1960 | Keim .................................. 260/29.2 |
| 3,378,379 | 4/1969 | Shiner et al. .......................... 99/176 |
| 3,898,348 | 8/1975 | Chiu et al. ........................... 426/413 |
| 3,935,320 | 1/1976 | Chiu et al. ........................... 426/105 |
| 4,142,013 | 2/1979 | Hammer et al. ....................... 428/36 |
| 4,161,968 | 7/1979 | Rasmussen et al. ............... 138/118.1 |
| 4,207,353 | 6/1980 | Rasmussen et al. ................ 426/513 |
| 4,248,900 | 2/1981 | Hammer et al. ..................... 426/105 |
| 4,399,839 | 8/1983 | Hutschenreuter ............... 138/118.1 |

FOREIGN PATENT DOCUMENTS 1201830 8/1970 United Kingdom .
1381231 1/1975 United Kingdom .

Primary Examiner—John E. Kittle
Assistant Examiner—James J. Seidleck
Attorney, Agent, or Firm—Schwartz, Jeffery, Schwaab, Mack, Blumenthal & Evans

[57] ABSTRACT

Disclosed is a tubular food casing which comprises a support tubing of cellulose hydrate comprising water and from about 15 to 30% by weight of a plasticizer and a coating layer applied to the inside surface of the tubing, which comprises a water-insoluble, cured cationic resin, especially a resin based on protein formaldehyde, urea formaldehyde or melamine formaldehyde or a condensation product of an aliphatic polyamine or polyamide or a polyamine-polyamide with bifunctional halohydrins or the derivatives thereof, such as epichlorohydrin, or mixtures of these resins, and additionally a natural oil, a synthetic triglyceride mixture with vegetable fatty acids having from 4 to 14 carbon atoms in their carbon chain, a paraffin oil and/or a silicone oil and optionally one or more than one emulsifier for the oil. Also disclosed is a process for the manufacture of the tubing and a use of the tubing as an artificial sausage casing.

22 Claims, No Drawings

TUBULAR FOOD CASING HAVING A COATING ON ITS INSIDE SURFACE, A PROCESS FOR ITS MANUFACTURE AND USE AS A SAUSAGE SKIN

BACKGROUND OF THE INVENTION

The present invention relates to a tubular food casing, and further to a process for the manufacture and its use as an artificial sausage casing.

Tubular food casings based on cellulose hydrate, which have an untreated inside surface, find only limited use as sausage casings since, in the case of fresh sausages, the sausage meat adheres so firmly to the packaging casing that the casing can hardly be peeled from the filling when required and, in the case of uncooked sausages, for example, dry sausages, adhesion is so poor that the casing detaches itself from the sausage meat in the drying process during storage. As a consequence of this separation of the casing from the filling in the course of drying of the long-keeping sausage, the casing does not shrink together with the filling and thus becomes wrinkled and unsightly.

U.S. Pat. No. 3,935,320 discloses artificial sausage casings based on cellulose hydrate, for use in the production of dry sausages. These casings are provided on their inside and outside surfaces with coatings of proteinaceous chemical compounds in order to obtain sufficient adhesion between the sausage meat and the casing. Proteinaceous compounds of the type mentioned include, for example, a chemically modified protein, such as casein or gelatin (U.S. Pat. No. 4,142,013) and epichlorohydrin-polyamine-polyamide, urea-formaldehyde or melamine-formaldehyde resins (U.S. Pat. No. 3,378,379).

However, reaction between these substances and the hydroxyl groups of the cellulose does not sufficiently terminate before the casing exits the drying device. There is, therefore, a risk that the substances will partially react with the hydroxyl groups of the adjoining opposite surface of the tubular casing after the casing has been laid flat and rolled up, especially if the tubing has a high moisture content and is subjected to strong compression. This reaction becomes apparent as an undesired adhesion of the tubular casing when it is used for further processing, for example, shirring or stuffing, after having been stored on a roll.

Furthermore, the use of the afore-mentioned chemical compounds frequently involves the risk that the cellulose hydrate forming the tubular casing will crosslink in an undesirable and uncontrollable manner, rendering the casing brittle. When the tubular casing is then used for its intended purpose, for example, when it is shirred, breaks or holes may appear in the tubing wall.

It is also a disadvantage that for each type of casing the amount of coating substance applied must lie within a specific, relatively narrow range. If this range is exceeded, difficulties with peeling of the casing will occur; on the other hand, if the amount falls below this range, the tubular casing will separate from the filling.

SUMMARY OF THE INVENTION

It is therefore an object of the present invention to provide an improved tubular food casing.

A more particular object is the provision of a tubular food casing having both improved peelability and adhesiveness in relation to the sausage depending on the process step.

It is a further object of the invention to provide a cellulose hydrate tubing having a coating applied to the inner surface thereof which precludes cross-linking of the cellulose hydrate molecules.

Still another object of the invention is to provide a tubular food casing having a cellulose hydrate support tubing with a coating layer applied to the inner surface thereof which prevents the casing from detaching from the sausage meat during drying of an uncooked sausage and, at the same time, provides a good separating effect between the sausage meat and the tubular casing.

A still further object of the invention is the provision of a coating for cellulose hydrate tubings which comprises chemical substances which satisfy the provisions of food laws, is inexpensive, and does not add additional process steps to the standard coating process.

In accomplishing the foregoing objects, there has been provided in accordance with one aspect of the invention a tubular food casing, comprising a support tubing based on cellulose hydrate comprising water and from about 15 to 30% by weight, relative to the total weight of the support tubing, of a plasticizer, and a coating layer applied to the inside surface of the support tubing, comprising a first component comprising a synthetic triglyceride mixture of vegetable fatty acids having from 4 to 14 carbon atoms in the carbon chain, a paraffin oil, a silicone oil, a natural oil or a combination thereof and a second component, comprising a water-in-soluble cured cationic resin.

In a preferred embodiment, the cationic resin is a condensation product selected from the group consisting of protein and formaldehyde, melamine and formaldehyde, urea and formaldehyde, and a bifunctional halohydrin and a compound selected from polyamines, polyamides, polyamides-polyamines or a combination thereof.

In accordance with another aspect of the present invention, there has been provided a process for preparing a tubular food casing comprising the steps of providing a support tubing of cellulose hydrate gel prepared by coagulating viscose, coating the inside surface of the support tubing with a liquid comprising from about 0.3 to 2.5% by weight of the second component and from about 3 to 30% by weight of the first component, passing the coated tubing in a substantially vertical direction between squeeze rollers to restrict the thickness of the coating layer, inflating the tubing and drying the tubing.

In still another aspect of the present invention, there has been provided an artificial sausage casing for cooked and uncooked sausages manufactured from the casing described above.

Admittedly, it is known from the prior art to provide the inside surfaces of cellulosic tubular food casings with a coating comprising a mineral oil (British Pat. No. 1,381,231) or a mixture of a water-soluble cellulose ether (U.S. Pat. No. 3,898,348), chemically modified starch, partially saponified polyvinyl alcohol or microcrystalline cellulose (U.S. Pat. No. 4,248,900) and a vegetable oil. These casings are unsuitable for uncooked and cooked sausages, instead they are intended for use in the production of sausages having so-called "peelable casings". Such sausages have their casings mechanically removed from the filling prior to being sold or further processed. The known casings should therefore ensure a troublefree mechanical separation of the tubular casings from the sausage filling, i.e., meat should not be torn from the sausage with the casing and the casing should not be damaged by the action of mechanical forces. A casing of this type is thus unsuitable for use in the production of uncooked and cooked sausages.

In comparison, on the one hand, the tubular casing of the present invention surprisingly shows the property required for uncooked sausages, namely, that the sausage skin does not detach itself from the sausage meat during storage of the sausage, thus keeping its smooth and plump appearance. The abovementioned adhesion and embrittlement of the tubular casing while being stored in the flattened and rolledup state is almost entirely precluded. It was not to be anticipated that, in the present invention, linking of the chemical condensation product to the desired surface, i.e., to the surface directly coated with the condensation product, is not impaired, but is instead enhanced so that the effect of these products is, at the same time, improved.

On the other hand, the sausage casing can readily be removed from the sausage meat prior to consumption; it does not break in an annoying manner when it is peeled from the filling. The present invention results in the inventive combination of substances, in which the individual components surprisingly do not mutually neutralize the others' effects. Normally, one would have to expect that the oil component added would render the condensation products ineffective.

Further objects, features and advantages of the present invention will become apparent from the detailed description of preferred embodiments which follows.

DETAILED DESCRIPTION OF PREFERRED EMBODIMENTS

The manufacture of tubular casings based on cellulose hydrate, which are in particular fiberreinforced, is known in the art and is not a subject matter of the present invention. A tubular casing of this kind usually has a water content ranging, for example, from about 5 to 15% by weight, or a very high water content of more than about 25% by weight so that it does not have to be soaked in water prior to filling. It is usually prepared by coagulating viscose and regenerating the cellulose. In addition, the tubing contains plasticizers, such as glycerol. The fiber-reinforcement preferably comprises a paper insert.

Processes for the internal coating of cellulose hydrate tubes have also been described in the prior art, for example, in British Pat. No. 1,201,830 and in U.S. Pat. Nos. 2,901,358 and 3,378,379. These processes do not, per se, form a part of the present invention.

The inside surface coating of the tubing includes a first component comprising a mixture of chemical substances based on a triglyceride mixture of vegetable fatty acids having from about 4 to 14 carbon atoms in the carbon chain, paraffin oil, silicone oil and/or natural oil and a second component including a water-insoluble cationic resin. The resin is preferably a condensation product of a protein, such as casein, with formaldehyde, for example, containing a proportion of formaldehyde which ranges from about 5 to 20% by weight, preferably from about 6 to 8% by weight, relative to the weight of protein, a condensation product of urea and formaldehyde (U.S. Pat. No. 2,616,874), a condensation product of melamine and formaldehyde (U.S. Pat. Nos. 2,796,362 and 2,345,543) and, preferably, a condensation product of epichlorohydrin with polyamine, polyamide or polyamine-polyamide (U.S. Pat. Nos. 2,573,956, 2,926,154 and 3,378,379). Polyamines which are suitable for the reaction with epichlorohydrin comprise simple alkylene diamines or polyalkylenepolyamines, for example, diethylene triamine, triethylene tetramine, tetraethylene pentamine and the corresponding polypropylene and polybutylene polyamines.

The polyamide-polyamines are condensation products of a saturated, aliphatic, dibasic acid which has from about 3 to 8 carbon atoms in the molecule, with one of the above-identified polyamines which has at least one secondary and two primary amino groups.

In the case of cellulose hydrate tubings without fiber-reinforcement, the inside surface of the tubing is impregnated with an aqueous solution containing a relatively low concentration of the still uncured condensation products. The concentration of the condensation products usually ranges from about 0.3 to 2.5% by weight, preferably from about 0.5 to 1.2% by weight, relative to the total weight of the solution which also contains the oil component which is emulsified therein. The oil component is present in a higher concentration which normally ranges from about 3 to 30% by weight, preferably from about 5 to 20% by weight, relative to the total weight of the solution.

In cellulose hydrate tubings which have a fibrous-paper insert, the variations in thickness of the material and the roughness of the inside surface necessitate a higher concentration of the condensation product, ranging from about 0.8 to 5% by weight, preferably from about 1.2 to 3% by weight and a lower oil concentration, ranging from about 0.5 to 15% by weight, preferably from about 2 to 6% by weight. The desired effect is only achieved by means of a stable coating liquid. It has therefore proven advantageous to form a stable oil emulsion and distribute this emulsion uniformly in the aqueous solution by vigorously stirring.

The inside surface coating of the tubing comprises a total of about 40 to 120 mg, preferably about 50 to 80 mg, of water-insoluble condensation product, relative to 1 square meter of support surface. These values are determined by the method described below.

200 mg of surface material is scraped from an area of 500 cm$^2$ on the inside surface of the tubing. The nitrogen content of the scraped-off material is determined, for example, by combustion analysis. As a comparison, the inside surface of a tubing made of the same support material which has, however, not been provided with a coating, is examined for its nitrogen content. For this purpose, 200 mg of surface material is likewise scraped from an area of 500 cm$^2$ on the inside surface and the nitrogen content is determined as indicated above. The difference between the nitrogen values of the coated and the uncoated tubings corresponds to the nitrogen value of the interior coating. The weight per unit area of water-insoluble condensation product present on the inside surface of the tubing is obtained from this value.

The inside surface coating of the tubing further comprises from about 25 to 2000 mg of the oil component, relative to 1 square meter of support surface. In fiber-reinforced tubes, the amount of oil component applied preferably corresponds to a weight per unit area of about 100 to 400 mg/m$^2$. For tubes which are not fiber-reinforced, the oil component is preferably used in an amount corresponding to about 50 to 200 mg/m$^2$ in the case of large-diameter types and about 300 to 1200 mg/m$^2$ in the case of small-diameter types and rings. The weight per unit area is determined by extraction of the internal coating with methylene chloride and gravimetric determination of the residue after removal of the solvent.

An increase in effect is not observed, if the aqueous solution prepared for internally coating the tubing contains the chemical substances forming the coating in concentrations which are higher than those specified above.

Particularly preferred natural oils include linseed oil, olive oil, sunflower oil, rape oil, palm oil, and coconut oil. The preferable triglyceride mixture of vegetable fatty acids advantageously contains saturated fatty acids, especially of a kind having a chain length from about 4 to 12, preferably from about 6 to 10 carbon atoms. Such triglyceride mixtures are commercially available, for example, under the trade name of ®Miglyol or ®Softenol. The oil proportion contained in the coating may also comprise a mixture of the above-specified preferrred natural oils. A suitable silicone oil is a dimethylpolysiloxane which is permitted by food laws.

Due to the preparation process, the coating contains chemical emulsifiers in amounts such that the desired properties of the coating or of the tubular casing having a coating on its inside surface are not affected. Examples of suitable emulsifiers include ethoxylates or propoxylates of natural fatty acids, which are obtained, for example, by the saponification of natural oils, such as soybean oil, linseed oil, castor oil, and the like, and monoesters or diesters of natural fatty acids with polyhydric alcohols, for example, glycerol, pentaerithrytol, sorbitol, mannitol, and the like. Toxicologically harmless synthetic emulsifiers which are permitted by food laws, for example, alkyl or alkyl-aryl sulfates or sulfonates are also applicable. Ethoxylated soybean fatty acids are commercially available, for example, under the trade name of ®Deglycal. Ethoxylated castor oil acids are sold, for example, under the trade name of ®Cremophor. The emulsifiers are added in amounts from about 3 to 20% by weight, particularly from about 5 to 12% by weight, relative to the oil component.

The sorbitan fatty acid esters mentioned in the examples and also ethoxylated soybean fatty acids (52.5% of linoleic acid, 33.5% of oleic acid, palmitic acid, linolenic acid and arachidic acid +12 moles of ethylene oxide), ethoxylated castor oil acid (86% of castor oil acid, 9% of oleic acid, 2 to 3% of linoleic acid, 2% of stearic acid +36 moles of ethylene oxide) and ethoxylated oleic acids have proven to be particularly advantageous emulsifiers.

The manufacture of a casing according to the present invention is described by way of examples, it being understood that the examples are provided for illustrative purposes only and are in no way limitative to the present process.

EXAMPLE 1

The starting material is a tubular casing of cellulose hydrate which can be manufactured by conventional methods.

A particular length, for example, 350 m, of cellulose hydrate tubing is continuously coated on its inside surface with an aqueous solution, e.g., according to one of the afore-mentioned conventional methods. The tubing is then dried and subsequently optionally moistened with water so that it has a water content, for example, in the range of from about 8 to 10% by weight, relative to the total weight of the tubing.

The aqueous solution used for internally coating the cellulose hydrate tube is, for example, prepared as follows.

A total of about 3 to 25 g of a heat-curable precondensate, for example, epichlorohydrinpolyamine-polyamide precondensate, is dissolved in 1 liter of water, while stirring. The solution is admixed with a total of about 2 to 20 g of a chemical emulsifier, for example, soybean fatty acid and about 12 moles of ethylene oxide. Triglycerides of vegetable fatty acids, in an amount ranging from about 3 to 300 g, are then thoroughly emulsified in the vigorously agitated solution.

Usually, the impregnating solution is applied to the cellulose hydrate tubing in the course of tubing manufacture, prior to the drying step. For this purpose, the tubing of cellulose hydrate gel is filled with a sufficient quantity of the coating liquid, upstream of the drier entrance. Any excess coating liquid is held back by squeeze rollers.

The tubing of cellulose hydrate gel, which is in the inflated state, is then passed through the drier at a drying temperature, for example, from about 90° to 120° C. so that the precondensation is cured and fixed to the cellulose hydrate surface and the oil component is deposited on the condensate product.

The tubular food casing of the present invention, particularly advantageously, has a relatively small diameter or is ring-shaped, and is used as a sausage casing, especially in the shirred form or in the form of sections, preferably for the production of uncooked and cooked sausages. The term "uncooked sausages" includes the spreadable type, such as various kinds of soft pork sausages and the firm types, such as various kinds of cervelat-type and salami sausages, which are also called dry sausages. "Cooked sausages" include, for example, slightly smoked sausages, smoked ham sausage, minced pork sausage, mortadella sausage, Lyon sausage, yellow-skin sausage, and poultry sausage.

Upon smoking, the food casing of the invention exhibits an excellent smoke acceptance and develops an attractive smoke color.

The invention is explained in detail by the following non-limitative examples:

EXAMPLE 2

A fibrous-paper web is formed into a tubing having a diameter of 60 mm, by overlapping the edge zones of the web and adhesively bonding the overlapping area. The outside of the tube is coated with viscose. As is known, the viscose solution comprises an alkaline solution of sodium cellulose xanthogenate. The tube is then passed through acidic precipitating and regenerating baths which, for example, contain sulfuric acid, sodium sulfate and ammonium sulfate. The resulting tubing of cellulose hydrate gel comprising a fiber-reinforcement is, prior to drying, filled with about 6 to 8 liters of an aqueous emulsion in order to produce an internal coating. Upstream of the drier entrance, the tubing is laid flat by means of a pair of squeeze rollers so that excess emulsion is held back. The tubing is then inflated with support air and dried until it has a moisture content ranging from about 6 to 8% by weight and is subsequently remoistened by spraying with water to obtain a moisture content of from about 6 to 18% by weight.

The aqueous emulsion used has the following composition (quantities related to 10 liters of emulsion):
300 g of casein ( ®Rovita FN4, manufacturer Rovita),
125 ml of an aqueous formaldehyde solution (30% strength),
300 ml of glycerol, 300 ml of triglyceride on a basis of saturated $C_5$ to $C_{10}$ fatty acids (®Softenol special oil, manufacturer Dynamit Nobel) with 30 g sorbitan-monooleate-ethoxylate (®Tween 80, manufacturer Atlas Chemie).

To prepare the emulsion, the triglyceride mixture is first emulsified in 600 ml of water containing emulsifier. The emulsion obtained is admixed with the remaining aqueous solution (about 6 to 8 liters) while stirring.

The internal coating has a weight per unit area of 65 mg/m² of resin and 200 mg/m² of oil component.

EXAMPLE 3

A fibrous-paper tubing which is coated with viscose on its inside and outside surfaces and has a diameter of 60 mm is impregnated on its inside as described in Example 2. The aqueous emulsion used has the following composition (relative to 10 liters):

20.25 g of casein (®Rovita FN4, manufacturer Rovita),
2.7 ml of formaldehyde solution (30% strength),
0.4 l of epichlorohydrin-polyamine-polyamide resin (reaction product of ethylene diamine, adipic acid, diethylene-triamine and epichlorohydrin, 20% strength solution, ®Resamin HW 601, manufacturer Cassella),
0.3 l of glycerol,
3 l of triglyceride emulsion (10% strength, ®Softenol) with
30 g of sorbitan-monooleate-ethoxylate (®Tween 80).

The internal coating has a weight per unit area of 54 mg/m² of resin and 160 mg/m² of oil component.

EXAMPLE 4

A fiber-reinforced tubing of cellulose hydrate is provided with an internal coating, as described in Example 2. The emulsion used has the following composition (relative to 10 liters):

1 l of epichlorohydrin-polyamine-polyamide resin (10% strength solution, ®Resamin VHW 61/1, manufacturer Cassella),
0.3 l of glycerol,
3 l of triglyceride emulsion (10% strength, ®Miglyol 812, manufacturer Dynamit Nobel) with
30 g of sorbitan-monooleate-ethoxylate (®Tween 80, manufacturer Atlas Chemie) and sorbitan-monolaurate-ethoxylate (®Span 20, manufacturer Atlas Chemie) in a weight ratio of 1:1.

The internal coating applied comprises an amount of 58 mg/m² of resin and 175 mg/m² of oil component.

EXAMPLE 5

A viscose solution is extruded from an annular die into a coagulation bath containing sulfuric acid and the resulting coagulated tubing of viscose gel, which has a diameter of 40 mm, is regenerated into cellulose hydrate gel in an acidic medium. Prior to drying, the tubing of cellulose hydrate gel is filled with 2 liters of an aqueous emulsion in an internal coating step and is thus impregnated on the inside as described in Example 2. The emulsion has the following composition (relative to 10 liters):

17.5 g of casein (®Rovita FN4, manufacturer Rovita),
23.5 ml of formaldehyde solution (30% strength)
1 l of epichlorohydrin-polyamine-polyamide (10% strength solution, ®Resamin VHW 61/1, manufacturer Cassella),
0.3 l of glycerol,
3 l of triglyceride emulsion (10% strength, ®Softenol, manufacturer Dynamit Nobel) with
150 g of sorbitan-monooleate-ethoxylate (®Tween 80, manufacturer Atlas Chemie).

The internal coating applied comprises an amount of 51 mg/m² of resin and 155 mg/m² of oil component.

The tubings prepared in the preceding Examples are used in the form of sections or shirred sticks and are filled with sausage meat in order to prepare salami-type sausages. During storage of the sausages, the casings shrink together with the sausage meat and adhere well to the fillings. After storage periods of any length, the casings are readily peeled from the sausages.

The invention results in a substantial improvement of the properties exhibited by tubular food casings based on cellulose hydrate during processing and use thereof. When storing the laid-flat, rolled-up tubing, adhesion of the tubing material is permanently prevented, irrespective of its moisture content. Drying can be carried out under mild conditions, so that the internal impregnation of the tubing is not damaged. The peelability of the tubular casing is improved, without impairing its adhesion to the filling during storage of the sausages. Processing difficulties are no longer experienced when filling tube sections, since the sections are easily opened. If the tubing is to be converted into the form of a shirred stick, breaks or holes in the coating caused by the attack of the shirring elements do not occur in the shirring operation. Shirring is facilitated and it is possible to use conventional shirring apparatuses.

Fiber-reinforced large-diameter types of tubings have diameters of at least about 50 mm and usually up to about 90 mm, and in small-diameter types the diameters are smaller than about 48 mm, usually from about 32 to 42 mm.

What is claimed is:

1. A tubular food casing, comprising:
   a support based on cellulose hydrate comprising water and from about 15 to 30% by weight, relative to the total weight of said support tubing, of a plasticizer; and
   a coating layer applied to the inside surface of said support tubing, comprising an admixture which includes a first component and a second component, wherein said first component comprises a synthetic triglyceride mixture of vegetable fatty acids having from 4 to 14 carbon atoms in the carbon chain or a natural oil selected from olive oil, linseed oil, sunflower oil, rape oil, palm oil or coconut oil, or a mixture thereof, and said second component comprises a water-insoluble cured cationic resin.

2. A tubular food casing as defined in claim 1, wherein said support tubing comprises a fiber-reinforcement.

3. A tubular food casing as defined in claim 1, wherein said first component comprises a triglyceride mixture having from about 6 to 10 carbon atoms in the carbon chain.

4. A tubular food casing as defined in claim 3, wherein said triglyceride mixture comprises saturated fatty acids.

5. A tubular food casing as defined in claim 1, wherein said cationic resin is a condensation product selected from the group consisting of protein and formaldehyde, melamine and formaldehyde, urea and formaldehyde and a bifunctional halohydrin and a compound selected from a polyamine, a polyamide, a polyamide-polyamine or a combination thereof.

6. A tubular food casing as defined in claim 5, wherein said halohydrin comprises epichlorohydrin.

7. A tubular food casing as defined in claim 5, wherein said polyamide-polyamine comprises a condensation product of a saturated, aliphatic, dibasic acid having from 3 to 8 carbon atoms and said amine having at least one secondary and two primary amino groups.

8. A tubular food casing as defined in claim 5, wherein said condensation product comprises protein and formaldehyde.

9. A tubular food casing as defined in claim 8, wherein said formaldehyde content ranges from about 5 to 20% by weight, relative to the weight of said protein.

10. A tubular food casing as defined in claim 8, wherein said protein comprises casein.

11. A tubular food casing as defined in claim 1, wherein said coating layer comprises from about 0.3 to 2.5% by weight, relative to the total weight of the solution, of said second component and from about 3 to 30% by weight, relative to the total weight of the solution, of said first component.

12. A tubular food casing as defined in claim 2, wherein said coating layer comprises from about 0.8 to 5% by weight, relative to the total weight of the solution, of said second component and from about 0.5 to 15% by weight, relative to the total weight of the solution, of said first component.

13. A tubular food casing as defined in claim 1, wherein said coating layer comprises from about 40 to 120 mg of said second component per square meter of support tubing, and from about 25 to 2000 mg of said first component per square meter of support tubing.

14. A tubular food casing as defined in claim 1, further comprising at least one emulsifier.

15. A tubular food casing as defined in claim 1, wherein said casing comprises a shirred casing.

16. A tubular food casing as defined in claim 1, wherein said casing is closed at one end by a fastening means and the length of said casing corresponds to the length of the food product contained therein.

17. A process for preparing a tubular food casing as defined in claim 1, comprising the steps of:
providing a support tubing of cellulose-hydrate gel prepared by coagulating viscose;
coating the inside surface of said support tubing with a liquid comprising from about 0.3 to 2.5% by weight of said second component and from about 3 to 30% by weight of said first component;
passing said coated tubing between squeeze rollers to restrict the thickness of said coating layer;
inflating said tubing; and
drying said tubing.

18. A process as claimed in claim 17, wherein said coating liquid comprises from about 0.8 to 5% by weight of said second component and from about 0.5 to 15% by weight of said first component.

19. A sausage product comprising a tubular artificial sausage casing containing therein a semi-solid sausage filling, wherein said casing comprises a casing as defined in claim 1.

20. A tubular food casing as defined in claim 1, further comprising a paraffin oil, a silicone oil or a mixture thereof.

21. A sausage product as defined in claim 19, wherein said product comprises an uncooked sausage.

22. A sausage product as defined in claim 21, wherein said product comprises a dry sausage.

* * * * *